United States Patent [19]

Kidon et al.

[11] Patent Number: 5,562,992
[45] Date of Patent: Oct. 8, 1996

[54] RADIATION-CURABLE SILICONE RELEASE COMPOSITIONS AND COATED ARTICLES

[75] Inventors: William E. Kidon, Chardon; Michael D. Hilston; Thanh Nguyen, both of Painesville, all of Ohio

[73] Assignee: Avery Dennison Corporation, Pasadena, Calif.

[21] Appl. No.: 437,948

[22] Filed: May 10, 1995

Related U.S. Application Data

[62] Division of Ser. No. 284,252, Aug. 2, 1994, abandoned.

[51] Int. Cl.$^6$ .................... B32B 9/04; C08E 2/48
[52] U.S. Cl. .................... 428/447; 428/448; 522/99
[58] Field of Search .................... 428/447, 448; 522/99

[56] References Cited

U.S. PATENT DOCUMENTS

| | | | |
|---|---|---|---|
| 3,575,910 | 4/1971 | Thomas | 260/29.6 |
| 3,726,710 | 4/1973 | Berger et al. | 117/93.31 |
| 3,749,593 | 7/1973 | Keiser | 117/68 |
| 3,759,807 | 9/1973 | Osborn et al. | 204/159.23 |
| 3,878,263 | 4/1975 | Martin | 260/825 |
| 4,016,333 | 4/1977 | Gaske et al. | 427/447 |
| 4,026,826 | 5/1977 | Yoshida et al. | 260/25 |
| 4,064,286 | 12/1977 | Hahn | 427/44 |
| 4,201,808 | 5/1980 | Cully et al. | 428/447 |
| 4,301,268 | 11/1981 | Kropac | 528/26 |
| 4,306,050 | 12/1981 | Koerner et al. | 525/26 |
| 4,722,865 | 2/1988 | Huizer | 428/407 |
| 4,824,875 | 4/1989 | Gutek | 522/9 |
| 4,908,274 | 3/1990 | Jachmann et al. | 428/452 |
| 4,956,221 | 9/1990 | Gutek | 428/142 |
| 4,963,438 | 10/1990 | Weitemeyer et al. | 428/447 |
| 4,978,726 | 12/1990 | Doaler et al. | 525/479 |
| 5,034,084 | 7/1991 | Schfer et al. | 156/278 |
| 5,034,491 | 7/1991 | Wewers et al. | 528/41 |
| 5,057,579 | 10/1991 | Fock | 525/329.5 |
| 5,075,349 | 12/1991 | Ohba et al. | 522/99 |
| 5,104,847 | 4/1992 | Hann et al. | 503/227 |
| 5,115,039 | 5/1992 | Fock et al. | 525/329.5 |
| 5,115,040 | 5/1992 | Fock et al. | 525/329.5 |
| 5,118,723 | 6/1992 | Irifune et al. | 522/99 |
| 5,128,391 | 7/1992 | Shustack | 522/92 |
| 5,145,914 | 9/1992 | Esselborn et al. | 525/329.5 |
| 5,154,956 | 10/1992 | Fradrich | 428/40 |

OTHER PUBLICATIONS

Radiation Curable Silicones, TEGO RC726 Data Sheet. Th. Goldschmidt AG.
TMPTA Monomer Data Sheet, Radcure Specialties Inc., Feb. 1990.
ODA Monomer Data Sheet, Radcure Specialties Inc., Feb. 1990.
HDODA Monomer Data Sheet, Radcure Specialties Inc., Feb. 1990.
Uvecryl 7100, Data Sheet, Radcure Specialties Inc., Feb. 1990.
EB Curable Release Coatings, Skeist Inc., pp. 622–628., May 17, 1993.

*Primary Examiner*—Susan W. Berman
*Attorney, Agent, or Firm*—Renner, Otto, Boisselle & Sklar

[57] ABSTRACT

A radiation-curable silicone release composition is described which comprises (A) from about 2% to about 7% by weight of an organopolysiloxane containing acryloxy groups, methacryloxy groups, or mixtures thereof; (B) from about 90% to about 98% by weight of at least one acrylated or methacrylated organic polyhydroxy compound or polyamino compound; and (C) from 0% to about 5% by weight of a photoinitiator. In a preferred embodiment, (B) comprises a mixture of (i) at least one acrylated or methacrylated organic polyhydroxy compound and (ii) at least one acrylated or methacrylated polyamino compound. A method of producing silicone release-coated substrates, the release-coated articles thus produced and multi-layer articles or constructions incorporating a silicone-release layer also are described. The release coated papers and the constructions embodying such release coated papers of the invention exhibit improved and desirable dimensional stability and remain flat under a variety of service conditions.

12 Claims, No Drawings

RADIATION-CURABLE SILICONE RELEASE COMPOSITIONS AND COATED ARTICLES

This is a division, of application Ser. No. 08/284,252, filed Aug. 2, 1994, now abandoned.

TECHNICAL FIELD OF THE INVENTION

This invention relates to radiation-curable silicone release compositions, and in particular, to electron beam radiation-curable silicone release compositions.

BACKGROUND OF THE INVENTION

Release coating compositions are used, for example, to coat papers or films which are to be used as a release backing, or a protective release sheet over the adhesive for pressure-sensitive labels, decals, tapes, etc. Labels which are provided with a pressure-sensitive adhesive still adhere to the release coated surface to a sufficient extent to enable the backing sheets with the adhesive labels thereon to be handled. However, it is essential that the labels can be readily separated from the release coated backing sheet without significantly reducing the adhesive forces on the back of the label. When such products are to be used, the release backing sheet is pulled off and discarded. The exposed pressure-sensitive adhesive is pressed onto a surface where the decal or label is to be placed. A common variety of release paper is one wherein one side of the paper (the release side) is coated with a polymeric siloxane material.

Silicones and silicone copolymers have been used extensively as release layers on paper, film, etc., because they are inherently low in surface energy. It is desirable that silicone-coated release papers and films have a release force which is low enough to enable the release paper to be easily removed from a pressure-sensitive adhesive-coated substrate but not so low that the release paper will become separated from the pressure-sensitive adhesive coating by forces normally encountered in the processing of the construction such as printing, die cutting and matrix stripping. "Release force" is defined as the amount of force required to peel or separate the release-coated substrate from the adhesive.

Polysiloxanes containing functional groups which can be radiation cured in the presence or absence of a photosensitizer have been described in various patents as useful silicone release compositions. U.S. Pat. No. 3,726,710 describes radiation-curable release compositions comprising an organopolysiloxane having olefinically unsaturated organic groups and a photosensitizer. The composition may be applied to a paper substrate and cured by exposure to high intensity radiation to produce a release coating.

U.S. Pat. No. 4,201,808 describes a release coating composition and release coated material which can be produced by applying to a substrate, for example, paper, a coating of a radiation-curable composition which comprises (a) from 10 to 90 weight percent of an organopolysiloxane containing an average of at least one acryloxy and/or methacryloxy group per molecule, (b) from 90 to 10 weight percent of a low molecular weight acrylyl crosslinker chosen from the group consisting of (i) di-, tri-, and tetra-functional acrylate or methacrylate esters of organic polyfunctional alcohols having a molecular weight of up to about 1200, and (ii) low molecular weight siloxane polyacrylates, and (c) from 0% to about 10% by weight of a photosensitizer.

The use of polysiloxanes with acrylate or methacrylate ester groups linked to SiC groups as radiation-curable coating materials for sheet-like carriers is described in, for example, U.S. Pat. Nos. 3,878,263; 4,064,286; 4,963,438; 4,908,274; 4,978,726; and 5,034,491. In the '274 patent, the polysiloxanes are prepared by reacting an epoxy-functional polysiloxane with acrylic or methacrylic acid. In the '726 patent, the polysiloxanes are obtained by reacting an epoxy-functionalized polysiloxane with an acrylic or methacrylic acid and a monocarboxylic acid free of double bonds capable of polymerizing. U.S. Pat. No. 4,963,438 describes acrylate containing polysiloxanes which are prepared by reacting polysiloxanes containing hydroxy-functional groups with a mixture of acrylic or methacrylic acid and a monocarboxylic acid which is free of double bonds capable of polymerizing.

It is desired to develop release coatings which can be applied to a substrate such as paper which is dimensionally stable and which remains flat (i.e., does not curl) under a variety of service conditions such as high humidity, elevated temperatures, freezer temperatures, etc., particularly when the release coated paper is used as a backing for a pressure-sensitive-coated laminate.

SUMMARY OF THE INVENTION

A radiation-curable silicone release composition is described which comprises (A) from about 2 % to about 7% by weight of an organopolysiloxane containing acryloxy groups, methacryloxy groups, or mixtures thereof; (B) from about 90% to about 98% by weight of at least one acrylated or methacrylated organic polyhydroxy compound or polyamino compound; and (C) 0% to 5 % by weight of a photoinitiator. In a preferred embodiment, (B) comprises a mixture of (i) at least one acrylated or methacrylated organic polyhydroxy compound and (ii) at least one acrylated or methacrylated polyamino compound. A method of producing silicone release-coated substrates, the release-coated articles thus produced and multi-layer articles or constructions incorporating a silicone-release layer also are described. The release coated papers and the constructions embodying such release coated papers of the invention exhibit improved and desirable dimensional stability and remain flat under a variety of service conditions.

DESCRIPTION OF THE PREFERRED EMBODIMENTS

The radiation-curable silicone release compositions of the present invention comprise at least two classes of materials: (A) an organopolysiloxane which contains acryloxy or methacryloxy groups, and (B) acrylated or methacrylated organic polyhydroxy compounds or polyamino compounds. Only a small amount, namely, from about 2% to about 7% by weight, preferably 4% to 6% by weight of the organopolysiloxane is contained in the silicone release composition of the present invention. It is surprising, therefore, that the release compositions of the present invention exhibit easy release characteristics and they do not bond or lock to adhesive surfaces.

The organopolysiloxanes which are useful in the release compositions of the present invention contain, as noted above, acryloxy groups, methacryloxy groups or mixtures thereof. A variety of acryloxy or methacryloxy containing organopolysiloxanes are known and can be used in the compositions of the present invention. In one embodiment, the organopolysiloxane compounds containing acryloxy and/or methacryloxy groups which can be utilized in the present invention may be presented by the general Formula I $$[R_nSiO_{4-n/2}]_m \qquad (I)$$

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the organopolysiloxane containing an average of at least one R group which contains an acryloxy or methacryloxy group, namely, $$CH_2=C(X)C(O)-O- \qquad (II)$$

wherein X is hydrogen or methyl. The substituents represented by R in structure I also include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the organopolysiloxane compounds containing acryloxy and/or methacryloxy groups useful in the present invention may be defined as containing from about 3 % to about 75 % by weight of acryloxy or methacryloxy groups, more often from about 3% to about 50% by weight of the acryloxy or methacryloxy groups. Such polysiloxanes which are useful in this invention have an average molecular weight of from about 1000 to about 20,000. Siloxanes of higher molecular weight also may be used but the higher molecular weight siloxanes are not preferred.

Typically, the R groups in Formula I have the structure $$CH_2=C(X)C(O)-O-R'- \qquad (III)$$

wherein R' is a divalent hydrocarbon group of from 1 to 15 carbon atoms or an oxyalkylene group containing from 1 to about 4 carbon atoms in the alkylene moiety.

The siloxanes containing the acryloxy or methacryloxy groups of structure III can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The organopolysiloxanes described above may be linear or branched and are preferably substantially linear. As will be recognized by those skilled in the art, the organopolysiloxanes of Formula I will also have an appropriate number of end-capping units, $R_3SiO-$ at the terminals of the molecule where R is as previously defined.

The organopolysiloxanes containing acryloxy and/or methacryloxy groups as described above are generally fluids which have viscosities in the range of from about 25 cps to 10,000 cps. Organopolysiloxanes of the type described above are known in the art, and various methods for producing such organopolysiloxanes are described in the patents identified in the Background. The disclosures of U.S. Pat. Nos. 3,878,263; 4,064,286; 4,301,268; 4,306,050; 4,908,274; 4,963,438; 4,978,726; and 5,034,491 are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation TEGO® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In addition to the acrylated organopolysiloxanes, the radiation-curable silicone release compositions of the present invention contain from about 90% to about 98 % by weight of at least one acrylated or methacrylated organic polyhydroxy compound or polyamino compound. These compounds contain at least two acryloyl or acrylyl groups, or at least two methacryloyl or methacrylyl groups which form a network upon polymerization. Suitable compounds useful as component (B) include compounds represented by the general formula $$R-(-CO-C(X)=CH_2)_n \qquad (VI)$$

where R is derived from a polyhydroxy compound or a polyamine or an organic compound containing hydroxy groups and amino groups, and n is an integer of at least 2 and is preferably 2, 3 or 4. Throughout the specification and claims, the compounds represented by the general Formula VI above will be further referred to as "acrylates" or "methacrylates" even though the compounds derived from polyamines form amides and not esters. The polyfunctional hydroxy and amino compounds react with acrylic or methacrylic acid containing at least 2 and as many as 4 or 5 hydroxy and/or amino groups. Generally the polyfunctional reactants contains from 2 to 4 and more often 2 or 3 hydroxy or amino groups.

The polyfunctional compounds containing at least 2 hydroxyl groups, 2 amino groups or both groups may be monomeric compounds such as ethylene glycol, diethylene glycol, 1,6-hexanediol, neopentyl glycol, trimethylolpropane, pentaerythritol, etc., or similar amine compounds such as ethylene diamine, 1,3-propanediamine, 1,4-butanediamine, 1,6-hexanediamine, dimethylenetriamine, dipropylenetriamine, triethylenetetramene, 5-amino-1-pentanol, and 3-amino-1propanol.

The polyalcohols and polyamines may also be oligomeric compounds such as dimeric, trimeric, or tetrameric polyhydroxy and polyamino compounds.

The acrylated or methacrylated organic polyhydroxy compounds or polyamino compounds (B) used in the release compositions of the present invention generally represented by the above Formula VI may be prepared by techniques well known to those skilled in the art such as by the reaction of the polyhydroxy compound or polyamine compound or amino alcohol with acrylic acid or methacrylic acid in amounts to provide the desired di-, tri-, tetra-, or polyacrylated product. The molecular weights of the acrylated or methacrylated products (B) may be as high as 2000 and are generally below about 1200. It is preferred that these acrylated or methacrylated compounds are liquids which are not too viscous so that they will readily be blended into the organopolysiloxane (A) and provide desired fluidity characteristics. In general, these compounds may have viscosities at 25° C. of from about 2 to about 2000 cps. The acrylates derived from polyhydroxy compounds generally have viscosities at 25° C. of from about 2 to about 500 cps, and more preferably between about 2 and 200.

Specific examples of acrylated or methacrylated organic polyhydroxy compounds include, for example, glycerol diacrylate, diethylene glycol diacrylate, 1,6-hexanediol diacrylate, triethylene glycol diacrylate, trimethylolpropane triacrylate, neopentylglycol di-, tri-, or tetra-acrylate, tripropylene glycol diacrylate, 1,6-hexanediol dimethacrylate, ethylene glycol dimethacrylate, etc.

Specific examples of acrylated or methacrylated organic polyamino compounds include, for example, N,N'-diacrylylethylenediamine, N,N'-diacrylyl- 1,3-propanediamine, N,N'-dimethacrylyl-1,6-hexanediamine, etc. Useful acrylated and methacrylated polyhydroxy compounds and polyamino compounds are available commercially. An example of a commercially available acrylated amine product is Uvecryl® 7100, an acrylated amine oligomer available from UCB Radcure, Atlanta, Ga. This acrylate functional oligomeric amine is a liquid having a viscosity in the range of 500–1500 cps at 25° C. and theoretical molecular weight of 800.

The radiation-curable silicone release compositions of the present invention generally contain from about 90% to about 98% by weight of at least one of the above-described polyacrylated or polymethacrylated organic polyhydroxy compounds or polyamino compounds. In another embodiment, the silicone-release compositions will contain from about 93% to about 98% by weight of said compounds.

The silicone-release compositions of the present invention preferably comprise a mixture of more than one acrylated or methacrylated organic polyhydroxy compound or polyamino compound (B). Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, component (B) comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In another embodiment of the present invention, a portion of the acrylated or methacrylated compound (B) may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates of (B). These monoacrylate compounds normally copolymerize with the polyfunctional acrylates and methacrylates.

The radiation-curable release compositions of the present invention optionally may contain at least one photoinitiator. The amount of photoinitiator included in the compositions of the invention may range from about 0% to about 10%, more often from about 0.5% to about 5% based on the total weight of the radiation-curable composition. A photoinitiator is incorporated into the curable compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzil ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9, 10-dibromoanthracene; 1,3-diphenyl-2-propanone; 1,4-naphthyl-phenylketone; 2,3-pentenedione; propiophenone; chlorothioxanthone; xanthone; and mixtures thereof.

In one preferred embodiment, the radiation-curable silicone release compositions comprise (A) from about 2% to about 7% by weight of an organopolysiloxane containing acryloxy groups, methacryloxy groups, or mixtures thereof; (B) from about 30% to about 70% by weight of at last one acrylated or methacrylated polyamine; (C) from about 10% to about 70% by weight of at least one acrylated or methacrylated organic polyhydroxy compound; (D) from about 0% to about 20% by weight of at least one liquid monoacrylate ester; and (E) from about 0% to about 5% by weight of at least one photoinitiator. As mentioned above the photoinitiator is not required for electron beam radiation curing.

The radiation-curable release compositions of the present invention are produced by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The radiation-curable compositions of the present invention can be stabilized against premature polymerization during storage by the addition of conventional polymerization inhibitors such as hydroquinone, monomethylether of hydroquinone, phenothiazine, di-t-butyl paracresol, etc. Amounts of 0.1 weight percent or less of the stabilizers are generally effective.

The radiation-curable release compositions of the present invention generally are applied to a substrate prior to curing. The compositions may be applied to a substrate as a coating by any conventional means known in the coating art such as roller coating, curtain coating, brushing, spraying, reverse roll coating, doctor knife, dipping, die coating, etc. In one particular embodiment, the liquid radiation-curable compositions of the invention are applied to a substrate using offset gravure techniques. The liquid being applied to the substrate may be heated or cooled to facilitate the coating process and to alter the depth of the penetration of the liquid coated into the substrate prior to curing.

A variety of substrates can be coated with the radiation-curable release coatings of the present invention, and the compositions can be applied to any substrate when it is desirable to modify the release properties of a surface of the substrate. For example, the compositions of the present invention can be employed to form release coatings on substrates such as paper, vinyl, polyester, polyolefins, non-woven fabrics, glass, steel, aluminum, etc. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. The present invention is particularly useful in providing release characteristics to paper and polymeric films.

The amount of radiation-curable silicone release compositions of the invention applied to the various substrates varies depending upon the characteristics of the substrate, the properties desired in the release coating, the radiation source utilized, and the particular formulation of the release composition. If an excess of the coating composition is applied to the substrate, the physical characteristics of the substrate may be affected in an undesirable manner. Also, for economic reasons, it is normally desired to apply the lowest amount of coating to obtain the desired result. Thus, applied coating weights may, depending on the substrate and intended use, ranges from about 0.1 to 10 or more grams/m$^2$. In general, when it is desired to produce a silicone release-coated paper useful as a protective cover for a pressure-sensitive adhesive tape, applied coating weights are from about 1 to about 3 grams/m$^2$. At these levels, desirable high release characteristics are obtained without distorting the essential components of the substrate so that a flat construction which has good performance in the end use can be produced.

The release compositions of the present invention can be cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. Photoinitiators are not required for election beam curing. One of the advantages of using radiation to effect cure of the composition is that polymerization takes place rapidly at ambient temperature, and heating is not necessary. The equipment for generating these forms of radiation are well known to those skilled in the art. Electron beam radiation is the presently preferred form of radiation to be used with the compositions of the present invention.

Curing of the release compositions of the present invention can be effected in a continuous manner by passing the release-coated substrate through radiation equipment which is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to 10 megarads, preferably below 4 megarads is sufficient to cure the silicone release compositions. Generally, the exposure is quite brief and curing is completed in about 0.1 to about 3 seconds. The actual exposure time required to give proper curing for various release compositions can be readily determined by one skilled in the an with a minimum of experimentation. Excess curing of the release compositions should generally be avoided.

Substrates which have been coated with the silicone release compositions of the present invention and cured exhibit desirable high-release properties, and the release coating is resistant to moisture and solvents and the coating is thermally stable. As indicated previously, a substrate which is coated with the cured silicone release composition of the present invention can be used as a protective covering for a second substrate having pressure-sensitive adhesive coating on its surface. The protective covering is normally applied to the adhesive-coated substrate by bringing the two coated substrates into surface-to-surface contact with the silicone release coating on the first substrate in contact with the pressure-sensitive adhesive on the second substrate. Application of a slight pressure is usually effective to cause the coated substrates to adhere together forming a four-layered laminate. When a silicone-coated release paper is prepared in accordance with the present invention is used as a protective covering on a pressure-sensitive adhesive tape, a desirable high-release force is required before the release-coated paper will separate from the adhesive tape, and there is little transfer of the silicone release coating from the paper onto the adhesive.

Accordingly, the present invention contemplates the use of the preparation of multi-layer articles or constructions comprising (a) a first substrate; (b) a second substrate; (c) a silicone release layer comprising the release coating composition of this invention which has been cured by exposure to radiation; and (d) a layer comprising a pressure-sensitive adhesive composition, wherein the release layer (c) is interposed between the first substrate and the layer of pressure-sensitive adhesive and is preferentially adherent to the first substrate, and the pressure-sensitive adhesive layer (d) is interposed between the release layer and the second substrate and is preferentially adherent to the second substrate. Additional layers can be interdispersed between the first substrate and the layer of pressure-sensitive adhesive and between the second substrate and the silicone release layer to provide additional desirable properties such as increased strength, increased dimensional stability, etc. As in previous applications described above, the first and second substrates may comprise a variety of materials including paper, polyolefins, vinyl, polyester, aluminum, etc., although substrates such as vinyl, polyolefins and paper are preferred.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", *Encyclopedia of Polymer Science and Engineering*, Vol. 1, pages 476–546, Interscience Publishers, 2nd Ed. 1985. Such compositions generally contain an adhesive polymer such as natural, reclaimed or styrene butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

The following examples illustrate the radiation-curable silicone release compositions of the invention. Unless otherwise indicated in the specification and in the claims, all parts and percentages are by weight, temperatures are in degrees Centigrade, and pressures are at or near atmospheric pressure.

|  | %/wt. |
| --- | --- |
| Example 1 | |
| RC-720 silicone | 5.00 |
| Trimethylol propane triacrylate (TMPTA) | 95.00 |
| Example 2 | |
| RC-726 silicone | 5.00 |
| TMPTA | 60.00 |
| Hexanedioldiacrylate (HDODA) | 35.00 |
| Example 3 | |
| RC-726 silicone | 5.00 |
| TMPTA | 60.00 |
| HDODA | 25.00 |
| ODA (Mixture of octyl and decyl acrylates) | 10.00 |
| Example 4 | |
| RC-450 | 5.50 |
| Uvecryl 7100 | 94.50 |
| Example 5 | |
| RC-450 | 6.00 |
| Uvecryl 7100 | 52.00 |
| TMPTA | 21.00 |
| HDODA | 21.00 |
| Example 6 | |
| RC-726 silicone | 6.00 |
| Uvecryl 7100 | 52.00 |
| TMPTA | 14.00 |
| HDODA | 14.00 |
| ODA | 14.00 |

The radiation-curable silicone release compositions of this invention which contain only 2% to 7% and preferably 4% to 6% by weight of a polysiloxane provide cured coatings and films which have excellent release characteristics, and when applied to a substrate such as paper, the coated paper exhibits improved dimensional stability under varying conditions such as temperature, humidity, aging, etc. A particularly desirable property of substrates such as paper which have been coated with the release compositions of this invention and constructions such as labels prepared therefrom is that they lay flat and remain flat over time, even when exposed to moisture and low or high temperatures. The surface characteristics of the coated construction allows for printing by laser printers providing good toner anchorage and printing by flexographic techniques, when used in combination with generally available primers, print inks and over-varnishes.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:
1. A method of producing a silicone release coated substrate which comprises
   (A) applying to a substrate a coating of a radiation-curable silicone release composition comprising
      (A-1) from about 2% to about 7% by weight of an organopolysiloxane containing acryloxy groups, methacryloxy groups, or mixtures thereof;
      (A-2) from about 93% to about 98% by weight of at least one acrylated or methacrylated organic polyamine compound or a mixture of at least one acrylated or methacrylated organic polyhydroxy compound and at least one acrylated or methacrylated organic polyamine compound; and
      (A-3) from 0% to about 5% by weight of a photoinitiator wherein said percentages are based on the total weight of the silicone release composition; and
   (B) curing the coating on the substrate by exposing the coating to radiation.

2. The method of claim 1 wherein the composition is cured with an electron beam.

3. The method of claim 1 wherein (A-2) is at least one acrylated or methacrylated organic polyamine compound.

4. A multi-layer article comprising
   (A) a first substrate;
   (B) a second substrate;
   (C) a silicone release layer comprising a radiation-curable silicone release composition comprising
      (C-1) from about 2% to about 7% by weight of an organopolysiloxane containing acryloxy groups, methacryloxy groups, or mixtures thereof;
      (C-2) from about 93% to about 98% by weight of at least one acrylated or methacrylated polyamine compound or a mixture of at least one acrylated or methacrylated organic polyhydroxy compound and at least one acrylated or methacrylated organic polyamine compound; and
      (C-3) from 0% to about 5% by weight of a photoinitiator; which has been cured by exposure to radiation wherein said percentages are based on the total weight of the silicone release composition; and
   (D) a layer comprising a pressure-sensitive adhesive composition wherein the release layer (C) is interposed between the first substrate and the layer of pressure-sensitive adhesive and is preferentially adherent to the first substrate, and the pressure-sensitive adhesive layer (D) is interposed between the release layer and the second substrate and is preferentially adherent to the second substrate.

5. The article of claim 4 wherein the first and second substrates are paper.

6. The multi-layer article of claim 4 wherein (C-2) is at least one acrylated or methacrylated polyamine compound.

7. A multi-layer article comprising
   (A) a first substrate;
   (B) a second substrate;
   (C) a silicone release layer comprising a radiation-curable silicone release composition comprising
      (C-1) from about 2% to about 7% by weight of an organopolysiloxane containing acryloxy groups, methacryloxy groups, or mixtures thereof wherein the polysiloxane is characterized by the formula $$[R_n S_i O_{4-n/2}]_m \qquad (I)$$

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2; the organopolysiloxane containing an average of at least one R group which contains an acryloxy or methacryloxy group, namely, $$CH_2=C(X)C(O)-O-  \quad (II)$$

wherein X is hydrogen or methyl;

(C-2) from about 93% to about 98% by weight of at least one acrylated or methacrylated polyamine compound or a mixture of at least one acrylated or methacrylated organic polyhydroxy compound and at least one acrylated or methacrylated organic polyamine compound $$R-(-CO-C(X)=CH_2)_n \quad (VI)$$

where R is derived from a polyhydroxy compound or a polyamine or an organic compound containing hydroxy groups and amino groups, and n is an integer of at least 2; and (C-3) from 0% to about 5% by weight of a photoinitiator; which has been cured by exposure to radiation wherein said percentages are based on the total weight of the silicone release composition; and (D) a layer comprising a pressure-sensitive adhesive composition wherein the release layer (C) is interposed between the first substrate and the layer of pressure-sensitive adhesive and is preferentially adherent to the first substrate, and the pressure-sensitive adhesive layer (D) is interposed between the release layer and the second substrate and is preferentially adherent to the second substrate.

8. The multi-layer article of claim 7 wherein (C-2) is at least one acrylated or methacrylated polyamine compound.

9. A release-coated article comprising a paper substrate which has been coated with a radiation-curable silicone release composition comprising (A) from about 2% to about 7% by weight of an organopolysiloxane containing acryloxy groups, methacryloxy groups, or mixtures thereof;

(B) from about 93% to about 98% by weight of at least one acrylated or methacrylated organic polyamine compound or a mixture of at least one acrylated or methacrylated organic polyhydroxy compound and at least one acrylated or methacrylated organic polyamine compound; and (C) from 0% to about 5% by weight of a photoinitiator wherein said percentages are based on the total weight of the silicone release composition, and which has been cured by exposure to radiation.

10. The release-coated article of claim 9 wherein (B) is at least one acrylated or methacrylated organic polyamine compound.

11. A method of producing a silicone release coated substrate which comprises (A) applying to a substrate a coating of a radiation-curable silicone release composition comprising (A-1) from about 2% to about 7% by weight of an organopolysiloxane containing acryloxy groups, methacryloxy groups, or mixtures thereof wherein the polysiloxane is characterized by the formula $$[R_nS_iO_{4-n/2}]_m \quad (I)$$

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2; the organopolysiloxane containing an average of at least one R group which contains an acryloxy or methacryloxy group, namely, $$CH_2=C(X)C(O)-O- \quad (II)$$

wherein X is hydrogen or methyl;

(A-2) from about 93% to about 98% by weight of at least one acrylated or methacrylated organic polyamine compound or a mixture of at least one acrylated or methacrylated organic polyhydroxy compound and at least one acrylated or methacrylated organic polyamine compound wherein said acrylated or methacrylated polyhydroxy and polyamine compounds are characterized by the formula $$R-(-CO-C(X)=CH_2)_n \quad (VI)$$

where R is derived from a polyhydroxy compound or a polyamine or an organic compound containing hydroxy groups and amino groups, and n is an integer of at least 2; and (A-3) from 0% to about 5% by weight of a photoinitiator wherein said percentages are based on the total weight of the silicone release composition; and (B) curing the coating on the substrate by exposing the coating to radiation.

12. The method of claim 11 wherein (A-2) is at least one acrylated or methacrylated organic polyamine compound.

* * * * *